Figure 1:
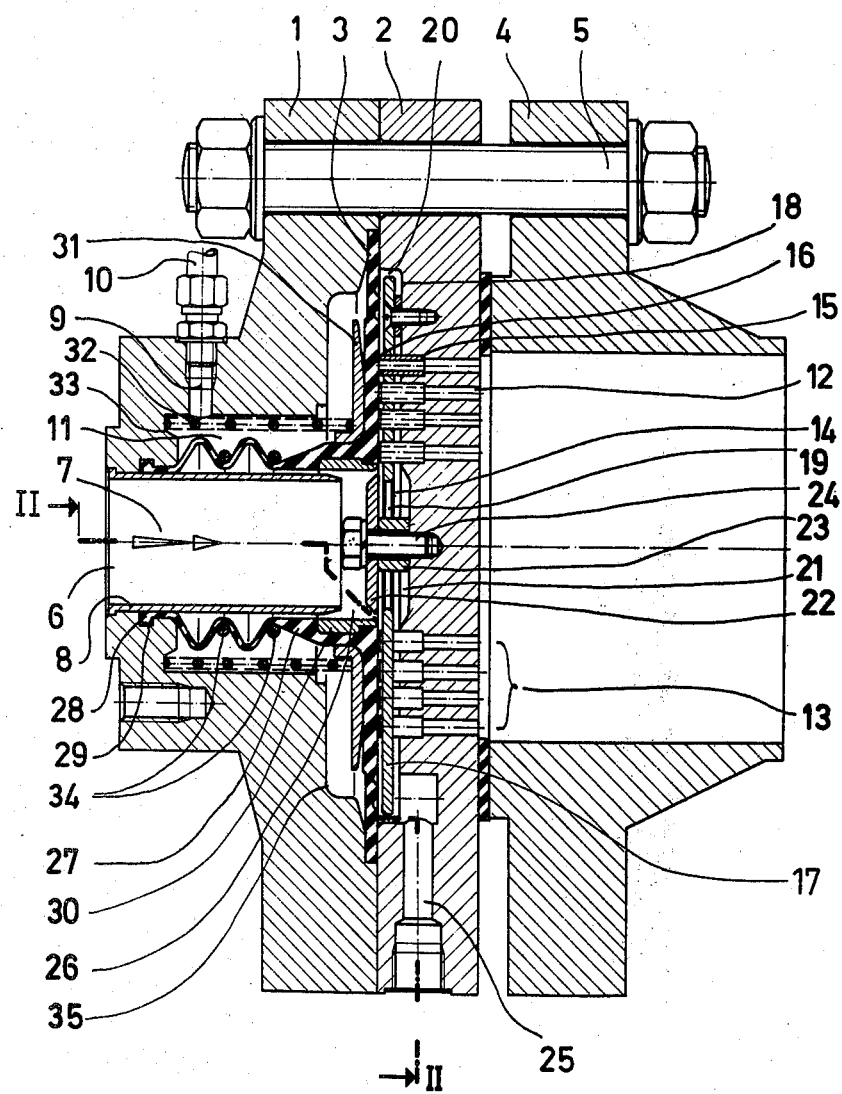

United States Patent [19]

Happe

[11] 4,299,250
[45] Nov. 10, 1981

[54] CHECK AND REGULATOR VALVE

[75] Inventor: Peter Happe, Eggenstein, Fed. Rep. of Germany

[73] Assignee: Johann Baptist Rombach GmbH & Co. KG, Karlsruhe, Fed. Rep. of Germany

[21] Appl. No.: 24,509

[22] Filed: Mar. 28, 1979

[30] Foreign Application Priority Data

Mar. 28, 1978 [DE] Fed. Rep. of Germany ....... 2813226

[51] Int. Cl.³ .......................................... F16K 15/14
[52] U.S. Cl. ............................. 137/546; 137/516.11; 137/859; 138/529
[58] Field of Search ................ 137/544, 512.1, 512.15, 137/529, 516.25, 516.27, 516.29, 516.11, 516.13, 516.15, 853, 859, 625.68

[56] References Cited

U.S. PATENT DOCUMENTS

| | | | |
|---|---|---|---|
| 1,707,306 | 4/1929 | Holdsworth | 137/512.1 |
| 2,236,477 | 3/1941 | Fuchs | 137/512.15 |
| 2,682,280 | 6/1954 | Nicklas | 137/512.15 |
| 2,690,763 | 10/1954 | Seligman | 137/516.11 |
| 2,747,608 | 5/1956 | Grove | 137/853 |
| 2,818,880 | 1/1958 | Radelbond | 137/516.11 |
| 3,032,060 | 5/1962 | Huffman | 137/529 |
| 3,062,415 | 11/1962 | Anderson | 137/512.15 |
| 3,083,941 | 4/1963 | Abos et al. | 137/516.13 |
| 3,129,721 | 4/1964 | Nealby | 137/859 X |
| 3,265,085 | 8/1966 | Koehler | 137/512.15 |
| 3,342,208 | 9/1967 | Steffes | 137/853 |
| 3,369,563 | 2/1968 | Deminger | 137/512.1 |
| 3,575,206 | 4/1971 | Ulmann | 137/529 |
| 3,792,720 | 2/1974 | Robbins | 137/625.28 |
| 3,807,444 | 4/1974 | Fortune | 137/512.15 |
| 4,129,143 | 12/1978 | Hoffmann | 137/859 |
| 4,191,211 | 3/1980 | Walker | 137/512.15 |

Primary Examiner—A. Michael Chambers
Attorney, Agent, or Firm—Craig and Antonelli

[57] ABSTRACT

A check and regulator valve, particularly for pipe lines carrying gaseous media, which includes an intake or inlet passage, a valve seat provided with open means for permitting a through flow of a medium, and a rubber-elastic setting member that closes off a compression or pressure chamber. The rubber-elastic setting member is sealingly connected by its edge with the valve seat and is adapted to be applied to the valve seat wholly or in part. The valve seat is constructed as a plate-shaped member and an elastically yielding disk member serves as a setting member. The disk member includes a through flow opening for the media at which is arranged an axially yielding tubular member connected to the input passage with the tubular member passing through the compression or pressure chamber.

18 Claims, 2 Drawing Figures

CHECK AND REGULATOR VALVE

The present invention relates to a valve arrangement and, more particularly, to a check and regulator valve especially for pipelines or conduits carrying a gaseous media, which valve includes an inlet or intake passage, a valve seat provided with passages for the gaseous media, and a rubber elastic setting member adapted to close off a pressure chamber, which setting member is adapted to be sealingly connected by its peripheral edges with the valve seat and adapted to be wholly or partly applied to the valve seat.

A check or regulator valve such as proposed by the present invention is particularly applicable in regulation of pressure and quantity of heating gases in gas distributing facilities and is also suitable as a check valve, safety check valve, and an on-off valve in a gas installation of any kind.

A check regulator valve construction has been proposed wherein a valve seat, fashioned as a sleeve-like double conical cast structure, is provided with two separate rings of axially disposed slits or openings which serve for the passage of the medium. The valve seat is surrounded by a rubber-elastic cuff membrane which serves as a setting member for closing off an annular pressure chamber. If the cuff member is applied to the cast structure by the upstream pressure of the medium, the slits or openings are covered and the valve is closed.

A disadvantage of the last-mentioned check and regulator valve construction resides in the fact that, upon any actuation of the valve, the cuff membrane is not only bent to a substantial degree but is also stretched or rumpled in various directions in a complex way. Moreover, when the valve is only partially open, the membrane has no defined position so that a tendency to flutter results.

The aim underlying the present invention essentially resides in providing a check and regulator valve construction wherein a setting member thereof is subjected to minimum stresses and has defined movements for various operating conditions of the valve so that the tendency to flutter is minimized.

According to advantageous features of the present invention, a check and regulator valve is provided which includes an inlet or intake passage, a valve seat provided with through passages for the medium to be conducted, and a rubber elastic setting member, adapted to close off a pressure chamber, is sealingly connected to the valve seat by means of its edge.

In accordance with the present invention, the valve seat is fashioned as a plate member with a disk-shaped member serving as the setting member which setting member includes a throughput opening for the medium being conveyed. An axially yielding length of tubing is connected to the setting member and communicates with the throughput opening, with the tube length passing through the pressure chamber.

By virtue of the above-noted structural arrangement of the present invention, the setting member, formed as a disk, will only be slightly stressed because of its permitted defined movements and will have no tendency to flutter so that the servicing intervals of the valve will be shortened with a consequent long life expectancy. Moreover, the check and regulator valve proposed by the present invention permits a construction which has a very short structural height and a low weight and, an otherwise necessary widening of the line cross section following the valve by, for example, conical pipe pieces, becomes unnecessary.

Advantageously, the plate forming the valve seat is of a circular configuration with the through passages for the medium being conducted being disposed on a circular surface so as to facilitate production of the proposed check and regulator valve of the present invention.

To simplify both the manufacture and assembly of the valve, according to further features of the present invention, the axially yielding length of tubing is fashioned as a section of corrugated tube and, preferably, is made as one piece with the setting member.

To guarantee a shape retention of the rubber-elastic disk-shaped member, in accordance with the present invention, a thrust ring may be disposed along the edge of the throughput opening. Advantageously, a pressure plate, urged by a closing spring, is provided on a side of the plate that is turned away from the throughput opening so as to insure a reliable closing of the valve.

To provide for a necessary stiffness of the length of tubing, according to the present invention, the axially yielding length of tubing is provided with a plurality of stiffening rings along an outside thereof for the purpose of radial stiffening.

In accordance with still further features of the present invention, a guide sleeve which penetrates into the axially yielding length of tubing is set on the inlet or input passage with the guide sleeve serving to guide the medium in a region of the tubular piece and thereby reduce flow losses. Moreover, the provision of the guide sleeve insures the proper positioning of the axially yielding tube piece with an open or a closed valve.

To insure a complete seal of the closed check and regulator valve, according to the present invention, the plate forming the valve seat is provided with a lower circular-cylindrical recess with the openings extending through the valve seat being guarded or protected by bushings set into the plate which bushings penetrate into the recess. By virtue of this arrangement, a high degree of surface pressure is afforded on an upper side of the bushings and, consequently, there is an especially good sealing of the respective openings. Moreover, the bushings are insertable so as to be readily removeable in the event repair of the valve is necessary.

In order to feasibly prevent deposition of particles or contaminants contained in the medium on the openings passing through the valve seat, a circular plate is disposed in the recess at a slight distance from the valve seat with the circular plate being penetrated by the bushings and including a central aperture or hole. The diameter of the circular plate in less than that of the recess so as to form an annular gap. This structural arrangement in accordance with the present invention results in a specific play upon the bushings radially by a flow of the medium and results in a holding of the openings essentially free of dirt or other contaminants.

To reinforce the effect of the above noted play, in accordance with the present invention, the circular plate may have a flat circular-cylindrical depression opposite the center hole, and for an easy removal of collected contaminants, advantageously, a closeable radially directed dirt discharge hole is provided in the plate forming the valve seat.

Advantageously, according to the present invention an impact plate is arranged forwardly of the center hole of the circular plate and is fixed to the plate by means of a foot or the like with the impact plate reinforcing the deflection of the flow of the medium in a radial direction.

A pressure line is provided and opens into the pressure chamber by means of which line the pressure in the pressure chamber can be varied.

Accordingly, it is an object of the present invention to provide a check and regulator valve which avoids, by simple means, shortcomings and disadvantages encountered in the prior art.

Another object of the present invention resides in providing a check and regulator valve which minimizes if not avoids the occurrence of fluttering during operation of the valve.

A further object of the present invention resides in providing a check and regulator valve which minimizes the stresses acting upon a setting member thereof.

Yet another object of the present invention resides in providing a check and regulating valve which is simple in construction and therefore relatively inexpensive to manufacture.

A still further object of the present invention resides in providing a check and regulator valve which minimizes the servicing requirements therefor.

Another object of the present invention resides in providing a check and regulator valve which permits an easy removal of contaminants therefrom.

A further object of the present invention resides in providing a check and regulator valve which functions reliably under all operating conditions.

Figure 2:
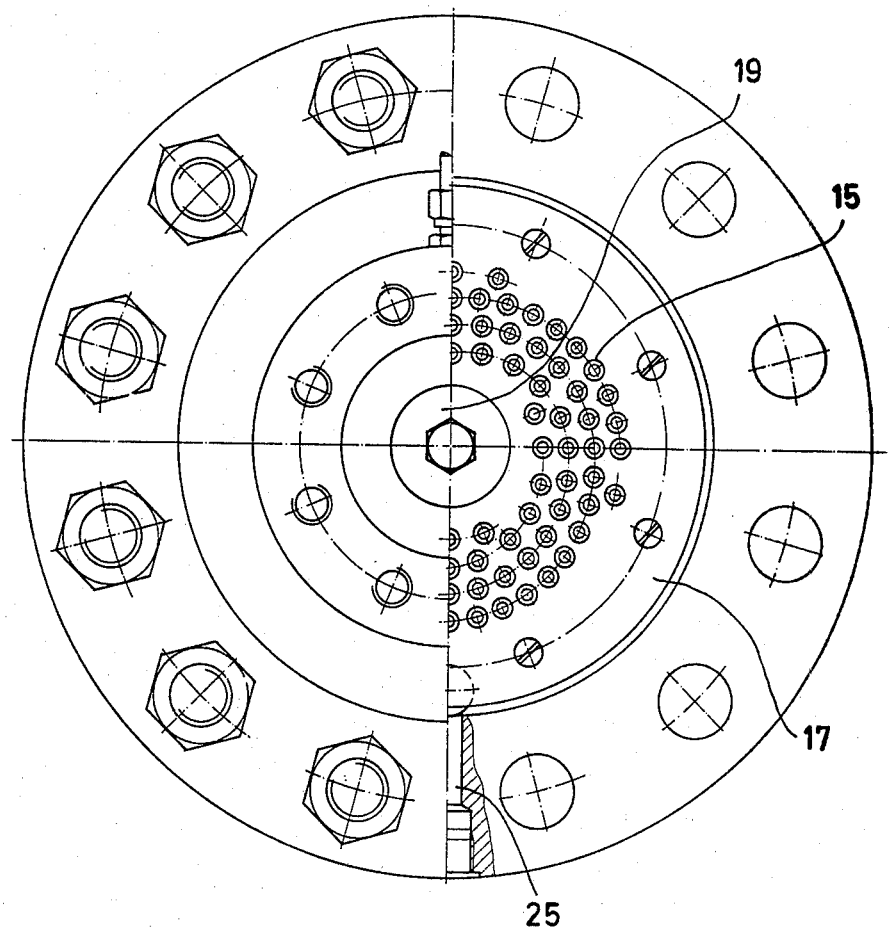

These and other objects, features, and advantages of the present invention will become more apparent from the following description when taken in connection with the accompanying drawings which show, for the purposes of illustration only, one embodiment in accordance with the present invention, and wherein:

FIG. 1 is an axial cross-sectional view of a check and regulator valve in accordance with the present invention; and FIG. 2 is a top view of the check and regulator valve of FIG. 1 partly cut along the line II-II in FIG. 1.

Referring now to the drawings wherein like reference numerals are used in both views to designate like parts and, more particularly, to FIG. 1, according to this Figure, the check and regulator valve includes a cylindrical valve housing, a circular plate 2 which serves as a valve seat, a rubber-elastic disk 3 which serves as a setting member, and a flange 4. A threaded bolt 5 or the like is provided for detachably connecting the valve housing 1, plate 2 and flange 4 together.

The cylindrical valve housing 1 is provided with an inlet or intake passage 6 into which a medium flows in the direction of the arrow 7. A guide sleeve 8 is disposed in the inlet passage with the sleeve 8 penetrating into the valve housing 1. A bore or hole 9 is provided on a side of the valve housing 1 for threadably receiving a pressure line 10 with the bore 9 opening into a pressure chamber 11 formed by the valve housing 1.

The flange 4 has an opening cross section which is greater by a multiple than the cross section of the inlet passage 6 and, in this manner, it is possible for an expanding flow of the medium behind the plate 2 which is expanded for the sake of noise reduction with the flow being divided into a plurality of individual flows. For this purpose, the plate 2, which serves as the valve seat, is provided with a ring of openings 12 which are disposed so as to form a 4-turn spiral 13 as shown most clearly in FIG. 2. The inlet end of the respective openings 12 are protected or guarded by cylindrical bushings 15 which are inserted into the plate 2 with the bushings 15 penetrating or extending into a circular-cylindrical recess 14 formed in the plate 2. The upper or forward ends 16 of the bushings 15 are slightly rounded.

A circular plate 17, through which the bushings 15 pass, is disposed in the recess 14 at a slight distance from the plate 2 or a floor 18 of the recess 14. The circular plate 17 has a center hole or opening 19 and the plate 17 has a diameter which is less than the diameter of the recess 14 so that an annular gap 20 is formed between the circular plate 17 and recess 14. The plate 2 is provided with a flat cylindrical depression 21, opposite the center hole 19, on the floor 18 of the recess 14.

A circular impact plate 22 is disposed in front of the center hole 19 at a slight distance from the plate 2 with the impact plate 22 being fixed to the plate 2 by means of a foot or projection 23, passing through the center hole 19, and a threaded fastener such as a screw 24.

A pressure-tight obturatable radially directed dirt discharge bore or hole 25 is provided in the plate 2 with the discharge bore 25 opening into the recess 14.

The circular disk 3, provided in the check and regulator valve of the present invention as a setting member, is fashioned of a rubber-elastic flexible material. The disk 3 includes a central throughput opening 26 for the medium on which there is, preferably, integrally formed an axially yielding tubular piece 27 which is constructed as a corrugated pipe or an accordion bellows. The tubular piece 27 extends centrally through the pressure chamber 11 and rests, with its free end, on the inlet or intake passage 6. The free end of the tubular piece 27 is clamped so as to be pressure tight between the valve housing 1 and the guide sleeve 8 in an annular groove 29 by means of a fastening projection or protuberance 28.

The disk 3 bears a thrust ring 30 on the edge of the opening 26 or on a shoulder of the tubular piece 27. A pressure plate 31 is provided on the side of the disk facing away from the openings 12 or bushings 15 inserted in the plate 2. The pressure plate 31 is urged by a helicoidal closing spring 32 which has one end abutting the pressure plate 31 and the other end thereof engaged or abutting an annular groove 33 formed inside the valve housing 1. Stiffening rings 34 are provided on the outside of the tubular piece 27 for the purpose of providing radial stiffening.

The operation of the check and regulator valve of FIGS. 1 and 2 is as follows:

Pressure chamber 11 is impinged upon through pressure line 10 by an upstream pressure of the medium flowing through the valve, which has the effect that the disk 3, serving as the setting member is pressed firmly against the plate 2, serving as the valve seat, and the disk 3 is applied to the front or inlet sides 16 of the bushings 15 that protrude somewhat beyond the circular plate 17 whereby the openings 12 are closed. The helicoidal closing spring 32 reinforces the pressing or urging of the disk in the direction of the plate 2.

As the pressure prevailing in the pressure chamber 11 diminishes more and more, then the upstream pressure of the medium in the inlet or intake passage 6 becomes effective between the disk 3 and plate 2 so as to lift the rubber elastic disk 3, starting from an outside area thereof, more and more whereby the axially yielding tubular piece 27 is increasingly shortened in length. With a completely opened check and regulator valve, all openings 12 are free and pressure plate 31 is applied, after suitable deformation of the disk 3, to the inner wall 35 of the valve housing 1. The guide sleeve 8, thrust ring 30 and stiffening rings 34 insure the intended positioning of the tubular piece 27 in the opening and closing as well as in the regulation of the valve.

During operation of the check and regulator valve, the circular plate 17, disposed in the recess 14 of the plate 2, together with the center hole and impact plate 22 effects a continuous play upon bushings 15 and the front or inlet sides 16 thereof whereby particles entrained by the medium, cannot settle in the region of the openings 12 so as to insure an acceptable functioning of the valve especially in the closed position thereof.

Nevertheless, particles or other contaminants deposited may be easily removeable by opening a dirt discharge hole 25 from time to time. The cross-section of the annular gap 20 is such that, in a vicinity thereof, the pressure of the flushing portion of the medium is high and its velocity is low so that the particles first hang there or stop where, because of the short separation between the circular plate 17 and disk 3, the pressure in the region of the bushings is low and the velocity of the medium is high, so that there the particles are pulled past. The impact plate and the gap provided between the plate 22 and the thrust ring 30 promote a development of radially directed flush and flow with correspondingly high velocity.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein but intend to cover all such modifications as are encompassed by the scope of the appended claims.

I claim:

1. A check and regulator valve for conducting gaseous media comprising:
   (a) a valve housing having inlet and outlet passage means for enabling a flow of said media through said housing;
   (b) a valve seat positioned within the said housing between said inlet and outlet means, said valve seat being in the shape of a circular plate having through-flow openings for passage of said media, said valve seat further includes a shallow circular-cylindrical recess, bushing means being inserted in each of said through-flow openings, the bushing means extend into the recess; and
   (c) an elastically flexible disk, wherein said disk is mounted at a rim thereof to said housing and is provided with a central aperture for enabling said flow of said media to pass therethrough from said inlet means to said outlet means and an axially resilient tubular section sealingly connected at one end to said disk at a location circumferentially adjacent the aperture and to said inlet passage means at an opposite end in a manner forming a pressure chamber in said housing on one side of said disk with said disk selectively sealably engaging said valve seat on a second side thereof for controlling flow through said openings.

2. A check and regulator valve for conducting gaseous media comprising:
   (a) a valve housing having inlet and outlet passage means for enabling a flow of said media through said housing;
   (b) a valve seat positioned within said housing between said inlet and outlet means, said valve seat being in the shape of a circular plate having through-flow openings for passage of said media; and
   (c) an elastically flexible disk, wherein said disk is mounted at a rim thereof to said housing and is provided with a central aperture for enabling said flow of said media to pass therethrough from said inlet means to said outlet means and an axially resilient tubular section sealingly connected at one end to said disk at a location circumferentially adjacent the aperture and to said inlet passage means at an opposite end in a manner forming a pressure chamber in said housing on one side of said disk with said disk selectively sealably engaging said valve seat on a second side thereof for controlling flow through said openings and wherein a guide sleeve is attached to said inlet passage means and extends into said axially resilient tubular section.

3. A check and regulator valve according to claim 1 or 2, characterized in that the axially resilient tubular section is constructed as a length of corrugated pipe.

4. A check and regulator valve according to claim 3, characterized in that the axially resilient tubular section is integrally formed with the disk.

5. A check and regulator valve according to claim 1, characterized in that a circular plate member is disposed in the recess at a slight distance from the valve seat with the bushing means extending through the circular plate member, the circular plate member having a diameter which is less than a diameter of the circular-cylindrical recess so as to form an annular gap, and in that the circular plate member includes a central hole.

6. A check and regulator valve according to claim 5, characterized in that a flat circular-cylindrical depression is provided on the valve seat at a position opposite the center hole in the circular plate member.

7. A check and regulator valve according to claim 6, characterized in that an obturatable radially directed dirt discharge hole is provided in the valve seat.

8. A check and regulator valve according to claim 7, characterized in that an impact plate means is disposed upstream of the center hole of the circular plate member, as viewed in a flow direction of the medium, and in that means are provided for fixing the impact plate to the valve seat.

9. A check and regulator valve according to claim 8, characterized in that a pressure line means is provided and opens into the pressure chamber.

10. A check and regulator valve according to claim 1 or 2, characterized in that a pressure line means is provided and opens into the pressure chamber means.

11. A check and regulator valve according to claim 1, wherein the diameter of said aperture corresponds to the diameter of said inlet passage means.

12. A check and regulator valve according to claim 1 or 11, characterized in that a pressure plate means is provided on said one side of the disk, and in that a spring means is provided for normally urging the pressure plate means in a direction toward the valve seat.

13. A check and regulator valve according to claim 12, characterized in that stiffening rings are provided on the axially resilient tubular member.

14. A check and regulator valve according to claim 2, characterized in that a pressure plate means is provided on said one side of the disk, and in that a spring means is provided for normally urging the pressure plate means in a direction toward the valve seat.

15. A check and regulator valve according to claim 14, characterized in that stiffening rings are provided on the axially resilient tubular member.

16. A check and regulator valve according to claim 2, wherein said axially resilient tubular section is a length of corrugated pipe.

17. A check and regulator valve according to claim 2, wherein said axially resilient tubular section is integrally formed with said disk.

18. A check and regulator valve according to claim 17, further comprising a thrust ring arranged along an edge of said aperture.

* * * * *